Feb. 28, 1950 M. W. BOXER 2,498,733
GEAR PUMP TYPE VARIABLE SPEED LIQUID DRIVE
Filed Aug. 9, 1947 2 Sheets-Sheet 1

INVENTOR
Martin W. Boxer
BY
Pennie, Edmonds, Morton and Barrows
ATTORNEYS

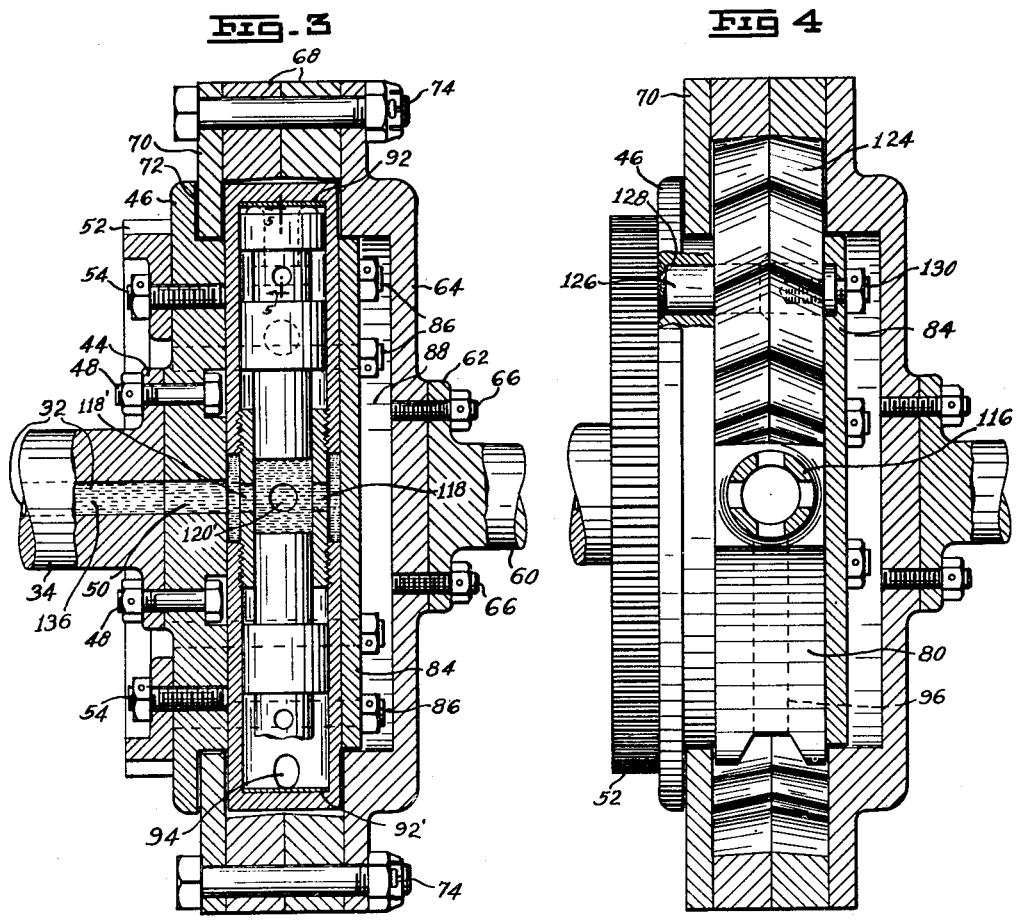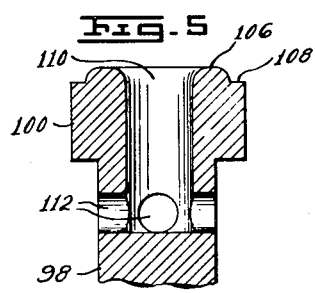

Patented Feb. 28, 1950

2,498,733

UNITED STATES PATENT OFFICE 2,498,733

GEAR PUMP TYPE VARIABLE SPEED
LIQUID DRIVE

Martin W. Boxer, Bronx, N. Y.

Application August 9, 1947, Serial No. 767,823

20 Claims. (Cl. 192—61)

This invention relates to liquid drive devices and has for its object certain highly useful improvements in such devices.

The invention relates particularly to the variable transmission of power or torque from the drive shaft of a motor, such as a gasoline or Diesel engine to a driven shaft. The driven shaft may be associated with any suitable driven object, such as the wheels of a vehicle, the drum of a derrick, etc.

The liquid drive device of the invention offers a number of advantages. It provides a simple automatic means for changing the apparent gear ratio between the motor and the given object. An infinite variety of such ratios may be obtained according to the needs of the moment. In other words, it provides a gear ratio between the drive shaft and the driven shaft suitable to the load of the driven object at any particular moment. The device is especially useful in passenger automobiles as a substitute for the conventional flywheel, clutch and transmission.

These and other features of the invention will be better understood by referring to the accompanying drawings, taken in conjunction with the following description, in which—

Figure 2:
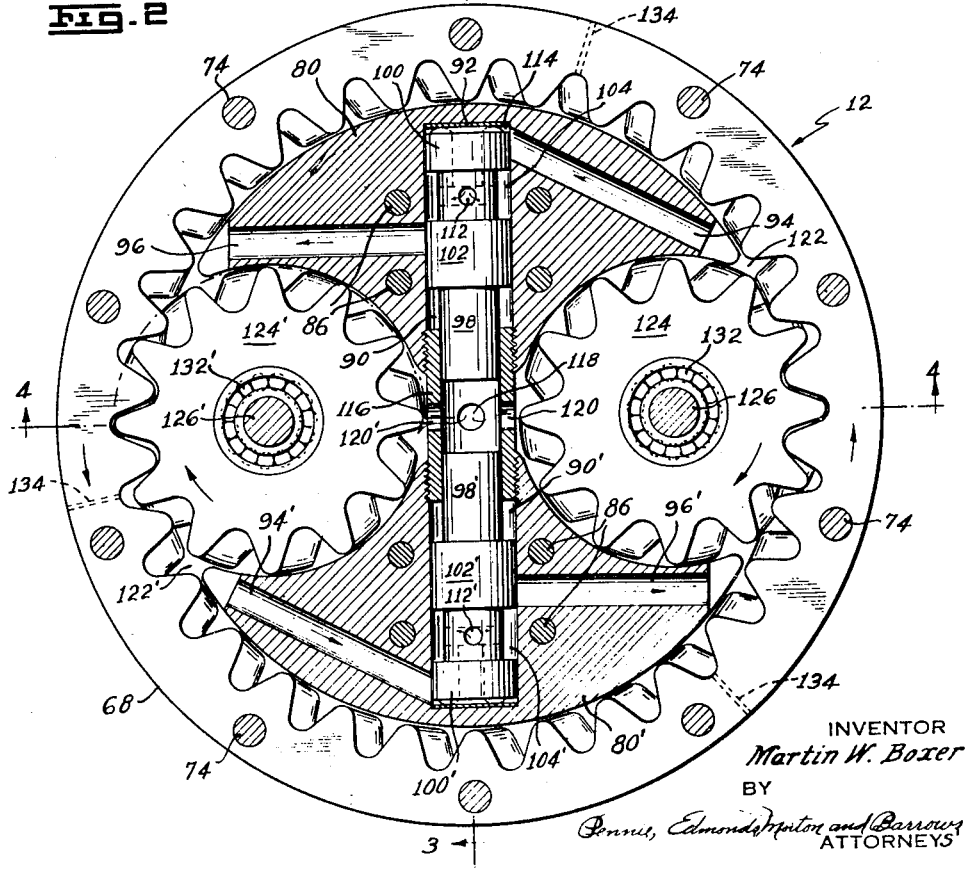
Fig. 2 is a section on the line 2—2 of Fig. 1.

Figs. 3 and 4 are sections on the lines 3—3 and 4—4 of Fig. 2, respectively; and Fig. 5 is a section on the line 5—5 of Fig. 3.

Figure 1:
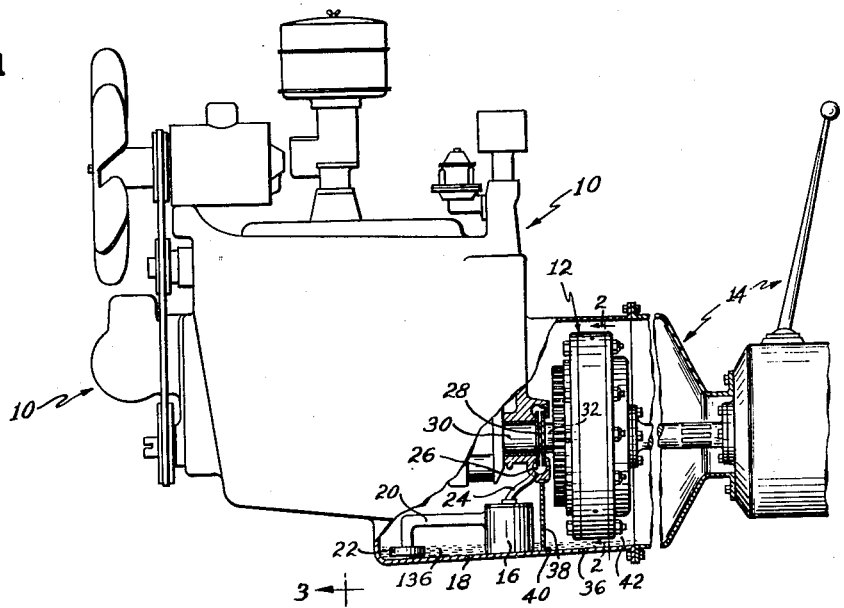
Fig. 1 is a side elevation of a conventional gasoline engine diagrammatically showing a liquid drive device, illustrative of a practice of the invention, associated therewith, the latter being shown in a broken away section.

Referring first to Fig. 1, there is shown a motor 10 connected to a liquid drive device 12 of the invention, the latter being shown associated with a reversing mechanism 14. A section of the housing for the motor is broken away and shows an engine oil pump 16 at the bottom of crank case oil pan 18 connected on one side to a suction line 20 and screen 22 at the base of the oil pan and on the other side to a discharge line 24 communicating with an annular conduit 26, in turn communicating with a plurality of oil passages 28 located around crank shaft rear main bearing 30. The oil passages connect with other passages, not shown, extending from the main bearing to the crank pins, all in the conventional manner prevalent in modern internal combustion engines.

In addition, however, for the purpose of the present invention, the oil passages communicate with a central conduit 32 (Fig. 3) extending axially through drive shaft 34 suitably connected to or forming a part of the crank shaft. The parts just described are enclosed in a housing 36, the liquid drive device being separated from the lower part of the motor by a partition 38 provided with a hole 40 at its bottom for the passage of oil from the liquid drive device compartment 42 to the oil pan.

Figs. 2–5 show various details of fluid drive device 12. Drive shaft 34 (Fig. 3) terminates in a flared end portion 44 butting against an end drive plate 46, the two being integrally secured to each other by a plurality of spaced bolts 48. Conduit 32 in drive shaft 34 communicates with a similar conduit 50 extending through the center of the end plate. A conventional external self-starter gear 52 is secured to the outer face of the end plate by a plurality of spaced stud bolts 54. This gear would be secured ordinarily to a flywheel but, as already noted, the liquid drive device of the invention may take the place of the flywheel.

Still referring to Fig. 3 more particularly, the liquid drive device also includes a driven shaft 60 with a flared end portion 62 butting against an end driven plate 64, the two being integrally secured to each other by a plurality of spaced bolts 66. End drive plate 46 and end driven plate 64 are separated from one another by an inner annular ring gear 68, preferably of the herring-bone type, and an annular side plate 70, the inner portion of which fits in an annular recess 72 in the inner side of the end drive plate. The end driven plate, inner ring gear and annular side plate are held together by a plurality of spaced lock bolts 74.

The space between the two end plates is occupied by what may be termed the internal or dynamic driving mechanism, which is solely secured to and supported by the end drive plate. It comprises a pair of juxtaposed cylinder blocks 80 and 80' (Fig. 2) lying immediately adjacent inner ring gear 68 and disposed between end drive plate 46 and an inner side plate 84 (Figs. 3 and 4), the cylinder blocks being secured to the drive and side plates by means of a plurality of spaced stud bolts 86, the inner ends of which fit into the end plate and the outer ends of which extend through the side plate into a space 88 between the side plate and end driven plate 64. The stud bolt nuts are locked in their tightened position.

Cylinder block 80 (Figs. 2 and 3) is provided with a radial cylinder 90 terminating short of the center of the end drive plate. The outer end of the cylinder is fitted with a bearing plate 92. A lateral inlet conduit 94 extends through one side of the cylinder block from the ring gear to the outer end of the cylinder at the bearing plate. A similar lateral outlet conduit 96 extends through the other side of the cylinder block from an intermediate portion of the cylinder to the ring gear. The cylinder is fitted with a piston or plunger 98 having an outer head or valve 100 and an intermediate side head or valve 102 spaced and adapted to close the conduits, respectively, when the piston or plunger moves outwardly as far as it will go in the cylinder. Space 104 is provided between the two heads, the stem of the piston and the cylinder wall.

As shown in more detail in Figs. 2, 3 and 5, the outer end of the piston is specially constructed to permit the passage therethrough of oil under certain operating conditions. Referring especially to Fig. 5, which is a sectional detail of that end of the piston, it will be seen that the outer end of the piston is provided with an inner raised annular ridge 106 defining an outer recessed annular flat surface pressure area 108 and the entrance to a central piston passageway 110 extending axially through outer head 104 into the stem of the piston, where it connects with four interconnecting lateral piston passageways 112 communicating with space 104. The ridge is adapted to make contact with bearing plate 92 (Figs. 2 and 3), and when contact occurs an annular space 114 is provided between the pressure area, the ridge, the bearing plate and the cylinder wall, which space in turn communicates with conduit 94. The annular ridge and the annular pressure area are adjusted in size relative to one another to facilitate operation of the liquid drive device, as will be explained in more detail below.

Cylinder block 80' is constructed and equipped like cylinder block 80, corresponding parts being identified by the same numbers primed. This convenience makes it unnecessary to describe cylinder block 80' and its accessory parts in detail. Where possible, this practice is followed below in describing the remainder of the device.

The threaded outer ends of a sleeve 116 fit into and are secured to the threaded inner ends of cylinders 90 and 90', thus in effect connecting the cylinders in a straight line relationship. The inside diameter or bore of the sleeve is such as to accommodate in a sliding fit the inner stem ends of pistons 98 and 98'. As shown in Figs. 3 and 2, the sleeve is provided with juxtaposed holes 118 and 118' in its side wall that register with hole 50 in end drive plate 46 and with conduit 32 in drive shaft 34. Juxtaposed ports 120 and 120', in effect at right angles to holes 118 and 118', are also in the sleeve wall to provide communicating passageways to juxtaposed spaces 122 and 122' between the cylinder blocks.

Juxtaposed internal drive gears 124 and 124', preferably of the herring-bone type, are fitted in spaces 122 and 122', respectively. Cylinder blocks 80 and 80' are shaped to accommodate the gears in the manner shown. As indicated more clearly in Figs. 2 and 4, the internal drive gears are in mesh with ring gear 68. Each drive gear is mounted on a shaft 126, one end of which extends into and is welded to end drive plate 46 at 128, and the other end of which extends partway into inner side plate 84. A stud bolt 130 extends through the side plate partway into the shaft to lock it at that end. As shown in Fig. 2, to facilitate rotation each drive gear is mounted on roller bearings 132.

A plurality of small vent holes 134 (Fig. 2) are placed around ring gear 68. They are adapted to vent air from the interior of the device to compartment 42 (Fig. 1); and, as will be seen, they also permit the passage of relatively small amounts of oil to the same compartment; although they may be sealed after the air is vented.

The operation of the liquid drive device may be considered under a few typical situations.

It may be assumed that the apparatus shown in the drawings forms part of an automobile, the rear wheels of which are driven.

When motor 10 is started (Fig. 1), its crank shaft is turned and this rotates drive shaft 34, end drive plate 46, and the parts secured thereto, including internal drive gears 124 and 124', and pump 16. The pump causes oil 136 to be sucked through screen 22 and line 20. The oil is driven by the pump through line 24; annular conduit 26; passages 28; drive shaft central conduit 32 (Fig. 3); end drive plate conduit 50; sleeve hole 118; sleeve 116; sleeve ports 120, 120' (Fig. 2); drive gear spaces 122, 122'; around the teeth of the gears; cylinder block lateral inlet conduits 94, 94'; outer end portions of cylinders 90, 90'; central piston passageways 110, 110'; lateral piston passageways 112, 112'; cylinder block lateral outlet conduits 96, 96'; and back to drive gear spaces 122, 122'. As it fills with oil, air in the interior of the devices is forced out of vents 134; which may then be closed permanently if desired.

Within the liquid drive device per se, the oil is free to circulate generally in the routes indicated, when the motor is idling. Oil passing from sleeve 116 through ports 120, 120' into spaces 122, 122', respectively, is advanced by the herring-bone teeth of drive gears 124, 124' through the spaces. The oil is then entrapped between the teeth of the drive gears and the teeth of ring gear 68 and carried between the teeth to the point where the teeth go into mesh. This occurs quite close to the entrances to inlet conduits 94, 94', so that the oil is displaced by the teeth and propelled through them into the outer end portions of cylinders 90, 90'. Since the oil is displaced by the relatively large herring-bone gear teeth, the action of the unit, in this respect, is similar to an ordinary positive displacement gear pump. The flow of oil is purposely constricted by the relatively small size of the conduits, compared with the full amount of oil the device is capable of pumping at higher speeds. At idling speed, the oil coming through conduits 94, 94' enters spaces 114, 114' and, if piston heads 100, 100' are in the way, bears against outer annular pressure areas 108, 108' on the piston heads at a pressure sufficiently high to force the piston inwardly in their cylinders. This permits the oil to flow over ridges 106, 106' into central passageways 110, 110', etc., as already described. Some of the oil may be allowed to escape from the interior of the device through vents 134 to compartment 42 if the vents are not sealed. This is relatively small in amount and does not at any time impair the action of the liquid drive. Some oil may seep through the joints of the device. Such oil as does escape to the compartment is permitted to pass (Fig. 1) through hole 40 in partition 38 to crank case oil pan 18 to be used over again.

At idling speed, the driving mechanism does not move the driven mechanism. Due to the weight of the automobile, the traction of the rear wheels on the ground, the resistance generally offered by the moving parts in the driven mechanism, etc.—all of which may be referred to as the normal inertia of the automobile—the drive mechanism is able to move without performing useful work. Specifically, directly after motor 10 is started and while it is at idling or very low speed, drive shaft 34 rotates about its own axis end drive plate 46 and all parts secured thereto and supported thereby, including cylinder blocks 80 and 80', and internal gears 124 and 124'. This means that the internal gears in turn rotate about their own axes while in mesh with outer ring gear 68, but without affecting the ring gear. In other words, as one looks at Fig. 2, internal gears 124 and 124' rotate about their own axes in a clockwise direction as they (and cylinder blocks 80 and 80', pistons 98 and 98', etc.) in turn rotate above the axis of drive shaft 34 in a counter-clockwise direction—while ring gear 68 (and annular side plate 70, end driven plate 64, driven shaft 60, etc.) remains stationary.

Now, let us consider what happens when the speed of motor 10 is increased. As the speed of the motor increases, the speed of oil pump 16 increases; and this in turn increases the pressure of the oil in liquid drive device 12. At the same time, the speed of rotation of drive shaft 34 increases. This in turn increases the speed of rotation of end drive plate 46 and its cooperating parts, more especially drive gears 124 and 124', cylinder blocks 80 and 80', and pistons 98 and 98', about the axis of the drive shaft. As the speed increases, the centrifugal force affecting the pistons is increased and they tend to move outwardly in their cylinders. A speed is ultimately reached at which piston heads or valves 100 and 100', and 102 and 102' begin to move across and to close inlet conduits 94 and 94', and outlet conduits 96 and 96', thus gradually reducing the circulation of oil in the device. This places the oil in the device under gradually increasing pressure, causing gears 124 and 124' to tend to slow down. The liquid oil between the drive gears and the driven gear is under compression; the resistance to the flow of oil from the high pressure side to the low pressure side of each drive gear adjacent the driven gear is increased; this causes the drive gear to tend to slow down, causing pressure to be applied through its teeth to the driven gear teeth; and this in turn causes the driven gear to rotate and thus to move the automobile. In this manner, the inertia of the automobile is gradually overcome, and enough power is transmitted to its rear wheels to move them. Finally, a motor speed may be reached that is sufficient to force raised annular ridges 106 and 106' on piston heads 100 and 100' tightly against bearing plates 92 and 92'. When this occurs, the oil between the teeth of the gears cannot be displaced as it cannot flow through the usual channels. The gears cannot rotate (theoretically) and the drive unit acts as a solid flywheel. Actually some oil will seep past the gear teeth at a slow rate allowing some very slow rotation of the gears. The oil in the device may in effect be considered a solid, and the transmission of power from the drive gears to the ring gear is direct and practically instantaneous.

If the automobile is to start on a hard surfaced level road, there will be a given motor speed at which the drive mechanism begins to turn the driven mechanism. That is, drive gears 124 and 124' will begin to move driven gear 68. If the automobile is to start upwardly on an inclined, and similar hard surfaced road, a higher motor speed is required to cause the drive gears to begin to turn the driven gear. By the same token, a lower speed is required if the automobile is to start downwardly on an incline. Similar variations occur when the load on the automobile is increased or descreased at any speed up to the maximum torque speed of the engine.

The pistons and accessory parts are so designed that the oil can flow in one direction only, as indicated by arrows in Fig. 2. When, therefore, the automobile is going down a hill, for example coasting, the transmission of power tends to be reversed. The pistons will be forced outwardly by centrifugal force, stopping the flow of oil, except that which occurs due to normal seepage. This, as already noted, causes the oil trapped between the drive gear teeth and the driven gear teeth to act somewhat as a solid. Ring gear 68, therefore, drives internal gears 124 and 124' in reverse direction, causing pressure to build up in the suction side of gears 124 and 124', since oil trapped in the suction side of the gears cannot escape due to the non-reversing oil flow design of the piston assembly 102 and 102'. The entire assembly revolves as a unit driving shaft 34 and the crank shaft with its accessory motor parts, all of which function to slow down the descending auto.

Gears 124 and 124' revolve clockwise about their axis when driven by the engine while the cylinder block assembly revolves counterclockwise. When the engine is being driven by the vehicle, as when traveling downhill, the ring gear becomes the driver and the ring gear attempts to rotate gears 124 and 124' counterclockwise. These gears must or will attempt to pump the oil back in a direction opposite to that in which it flows when the engine drives the gears. The oil cannot flow backward; the gears cannot rotate; consequently, the entire assembly rotates as a solid unit and drives the motor as in conventional vehicles. In other words, while going downhill or decelerating, the wheels drive the motor or engine, so that the engine is used as a brake, as is usual under such circumstances in autos.

When the speed of the automobile on the road is gradually decreased, say from 60 to 10 miles per hour, as the operator steps off the accelerator, the centrifugal force of pistons 98 and 98' is decreased until a point is reached at which the oil in spaces 114 and 114' from lateral inlet conduits 94 and 94' may exert sufficient pressure on annular flat surfaces 108 and 108' to move the pistons inwardly. When the operator steps on the accelerator, oil overruns raised ridges 106 and 106', goes through central piston passageway 110, lateral piston passageways 112 and 112' and lateral conduits 96 and 96'. In other words, the oil again circulates through the device and there is some rotation between gears 124 and 124' and ring gear 68, giving an apparent reduction in gear ratio enough to offset decreased motor torque at low speed.

A decrease in the load will in effect reduce the speed of rotation of the drive gears within the driven gear and give the automobile an apparent gear ratio approaching or equalling that of direct drive or, if desired, over drive. An increase in the load or a decrease in the speed of the engine due to load will react instantaneously on pistons 98 and 98', which in turn will allow more oil to circulate in the device, thus allowing the drive gears to rotate faster within the driven gear. This gives the engine a leverage increase equivalent to the necessary gear change in a car. This change, moreover, can be infinitesimal or large, according to the load, the speed and the throttle opening of the engine. Thus, a constantly varying apparent gear ratio is maintained between the engine and the rear wheels, according to necessity and the design of the device.

Oil leakage can be eliminated entirely, except for a drop or two, by placing a suitable seal in annular recess 72 between drive plate 46 and annular side plate 70. The seal is advantageously formed of thin spring brass shaped like Saturn Rings, or large washers. When cut through the diameter, a section shows it to be composed of two flat washers fastened around their outside edges and open space around their inside edges. Oil from inside the unit would enter the open space and the pressure of the oil would then spread, the washers or seal thus stopping all leakage therethrough. A space may be machined in the drive plate and the annular plate at the recess to accommodate the seal.

In practice when the pistons operate to shut off all oil flow in the unit, the oil under pressure will seep back to the low pressure side by traveling through the minute crevices between the gear teeth and the sides of the gears and the side plates. The small gears will therefore not stop rotating. Since the seepage is small and time is short, the engine rotating, for example, at about 33 R. P. S. without oil seepage at this point can make 34 R. P. S. with oil seepage at its worst. In a good tight-fitting unit about 6 R. P. S. would cover seepage with the car going 60 miles per hour. Since an engine does around 3,000 R. P. M. in that time, it is clear that 6 R. P. S. is infinitesimal.

Overdrive may be accomplished by changing the rear end ratio of the car, which is an extremely simple operation involving no additional mechanism. The ratio is, for example, about 4.5 to 1 in many cars. By changing it to about 3 to 1, it becomes an overdrive. This would, however, be impractical in conventional cars because it reduces engine power and requires incessant gear shifting. With the present drive unit, the change is not disadvantageous. Practically all friction is converted into useful torque and the efficiency of my unit is therefore very high.

The drive unit is run at engine temperature because it uses the same oil. There will be more oil seepage when the engine is cold, hence more engine power as the apparent gear ratios will be greater. When the unit warms up with the engine, clearances will close, oil seepage is reduced, and the engine will run with less leverage against the load.

It will be clear to those skilled in this art that the practice of the invention lends itself to a number of useful modifications. The oil, for example, may be introduced by various means into the interior of the device; it need not necessarily be through the drive shaft, although that is a convenient arrangement. It is not necessary that the drive assembly and the driven assembly be operatively associated in precisely the manner shown. What is important is that the parts that move relatively to one another be arranged to permit ready assembly and in such a way as to prevent undue loss of oil. As shown, the device is provided with a pair of drive gears and a pair of cylinder blocks, etc., arranged in alternate sequence. One or more gears and one or more cylinder blocks, etc., in alternate sequence could also be employed. The more drive gears, the smaller they will have to be; and this is also true of the cylinder blocks, etc. While the cylinders are shown radially from the axis of the drive shaft, they need not of course be in that precise direction. They could be inclined to either side. The gears, as stated, are preferably of the herringbone type. In addition they are advantageously so arranged that the outer edges of the teeth are the first to mesh so as to force oil between the teeth toward their center. It will be seen that the device of the invention is simple in construction and efficient in operation.

The number of parts in the device may be reduced. For example, the drive plate may be sufficiently thick to include the piston block or blocks, in which case the small gears would be fitted into machined recesses. The driven plate may be sufficiently thick to permit machining of the ring gear, or indeed a ring gear could be attached thereto. In such a construction, the small gears would be mounted on shafts extending into the side plates. Such and other modifications are readily available to one skilled in this art.

I claim:

1. In a liquid drive device of the type described having a drive assembly in operative association with a driven assembly, the improvement comprising a drive assembly containing a drive shaft integrally secured to an end drive plate, a pair of spaced drive gears rotatably supported by the drive plate, a pair of cylinder blocks integrally secured to the drive plate adjacent the drive gears, the drive gears and cylinder blocks being arranged in alternate sequence, a cylinder in each block extending radially from the axis of the drive shaft, an inlet conduit extending through each block from the pressure side of one adjacent drive gear to the head of the cylinder in the block, an outlet conduit extending through each block from a point intermediate the ends of the cylinder to the suction side of the other drive gear, a piston in each cylinder, each piston being provided with an enlarged outer head and an intermediate enlarged side head spaced and adapted simultaneously to close or open the conduits in its block, each piston also being provided with a passageway extending through the outer head to the space in the cylinder between the two piston heads, the piston stem and the cylinder wall; and a driven assembly containing a driven shaft integrally secured to an end driven plate, and a driven annular ring gear integrally secured to the driven plate, the ring gear being adjacent to the cylinder blocks and in mesh with the drive gear.

2. A liquid drive device according to claim 1, in which a passageway for oil extends through the drive shaft and the end drive plate to the interior of the device.

3. A liquid drive device according to claim 1, in which the ring gear is provided with a vent for the escape of air from the interior of the device.

4. A liquid drive device according to claim 1, in which the teeth of the drive gear and the ring gear are of the herring-bone type to facilitate passage of oil therebetween.

5. A liquid drive device according to claim 1, in which the cylinder blocks are integrally secured at their inner sides to an inner side plate, and the drive gears are each mounted on a shaft supported at its inner end by the inner side plate and at its outer end by the drive plate.

6. A liquid drive device according to claim 1, in which the outer end of each cylinder is fitted with a bearing plate for contact with its associated outer piston head.

7. A liquid drive device according to claim 1, in which an inner raised annular ridge and an outer recessed annular flat surface pressure area are provided on the outer end of each outer piston head.

8. A liquid drive device according to claim 1, in which a passageway for oil extends through the drive shaft and the drive plate to the interior of the device, and an inner raised annular ridge and an outer recessed annular flat surface pressure area adjacent thereto are provided on the outer end of each outer piston head.

9. A liquid drive device according to claim 1, in which the passageway in the outer head extends centrally therethrough into the stem of each piston, and the passageway communicates with a plurality of lateral passageways communicating with the space between the two piston heads, the piston stem and the cylinder wall.

10. A liquid drive device according to claim 1, in which a passageway for oil extends through the drive shaft and the drive plate to the interior of the device, an inner raised annular ridge and an outer recessed annular flat surface pressure area adjacent thereto are provided on the outer end of each outer piston head, the passageway in each outer head extends centrally therethrough into the stem of the piston, and the central passageway of each piston communicates with a plurality of lateral passageways communicating with the space between its two piston heads, the piston stem and the cylinder wall.

11. In a liquid drive device of the type described having a drive assembly in operative association with a driven assembly, the improvement comprising a drive assembly containing a drive shaft integrally secured to and end drive plate, a plurality of spaced drive gears rotatably supported by the drive plate, a plurality of spaced cylinder blocks integrally secured to the drive plate adjacent the drive gears, the drive gears and the cylinder blocks being arranged in alternate sequence, a cylinder in each block extending radially from the axis of the drive shaft, an inlet conduit extending through each block from the pressure side of one adjacent drive gear to the head end of the cylinder in the block, an outlet conduit extending through each block from a point intermediate the ends of the cylinder to the suction side of the other adjacent drive gear, a piston in each cylinder, each piston being provided with an enlarged outer head and an intermediate enlarged side head spaced and adapted simultaneously to close or open the conduits in its block, each piston also being provided with a passageway extending through the outer head to the space in the cylinder between the two piston heads, the piston stem and the cylinder wall; and a driven assembly containing a driven shaft integrally secured to an end driven plate, and a driven annular ring gear integrally secured to the driven plate, the driven gear being adjacent the blocks and in mesh with the drive gear.

12. A liquid drive device according to claim 11, in which a passageway for oil extends through the drive shaft and the drive plate to the interior of the device.

13. A liquid drive device according to claim 11, in which the ring gear is provided with one or more vents for the escape of air from the interior of the device.

14. A liquid drive device according to claim 11, in which the teeth of the drive gear and the teeth of the driven gear are of the herring-bone type to facilitate passage of oil therebetween.

15. A liquid drive device according to claim 11, in which the cylinder blocks are integrally secured at their inner sides to an inner side plate, and the drive gears are each mounted on a shaft supported at its inner end by the inner side plate and at its outer end by the drive plate.

16. A liquid drive device according to claim 11, in which the outer end of each cylinder is fitted with a bearing plate for contact with its associated outer piston head.

17. A liquid drive device according to claim 11, in which an inner raised annular ridge and an outer recessed annular flat surface pressure area are provided on the outer end of each outer piston head.

18. A liquid drive device according to claim 11, in which a passageway for oil extends through the drive shaft and the drive plate to the interior of the device, and an inner raised annular ridge and an outer recessed annular flat surface pressure area adjacent thereto are provided on the outer end of each outer piston.

19. A liquid drive device according to claim 11, in which the passageway in the outer head extends centrally therethrough into the stem of each piston, and the central passageway communicates with a plurality of lateral passageways communicating with the space between the two piston heads, the piston stem and the cylinder wall.

20. A liquid drive device according to claim 11, in which a passageway for oil extends through the drive shaft and the drive plate to the interior of the device, an inner raised annular ridge and an outer recessed annular flat surface pressure area adjacent thereto are provided on the outer end of each outer piston head, the passageway in each outer head extends centrally therethrough into the stem of the piston, and the central passageway of each piston communicates with a plurality of lateral passageways communicating with the space between its two piston heads, piston stem and cylinder wall.

MARTIN W. BOXER.

REFERENCES CITED

The following references are of record in the file of this patent:

UNITED STATES PATENTS

| Number | Name | Date |
|---|---|---|
| 1,896,577 | Foster | Feb. 7, 1933 |
| 2,095,393 | Miller | Oct. 12, 1937 |
| 2,204,261 | Fraser | June 11, 1940 |
| 2,242,112 | Chester | May 13, 1941 |
| 2,318,028 | Thomas | May 4, 1943 |
| 2,382,114 | Stephens | Aug. 14, 1945 |
| 2,435,244 | Stephens | Feb. 3, 1948 |

Certificate of Correction

Patent No. 2,498,733 February 28, 1950

MARTIN W. BOXER

It is hereby certified that errors appear in the printed specification of the above numbered patent requiring correction as follows:

Column 3, line 54, for "118' " read *118'*; column 4, line 57, for the word "piston" read *pistons*; column 5, line 16, for "above" read *about*; column 6, line 4, for "descreased" read *decreased*; column 9, line 40, for "and end" read *an end*;

and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*